(12) United States Patent
Freire (10) Patent No.: US 11,068,879 B1
(45) Date of Patent: Jul. 20, 2021

(54) SYSTEM AND APPLICATION TO CONTROL A TOUCH OPERATED DEVICE USING A MOBILE DEVICE

(71) Applicant: Joseph Freire, Long Beach, CA (US)

(72) Inventor: Joseph Freire, Long Beach, CA (US)

( * ) Notice: Subject to any disclaimer, the term of this patent is extended or adjusted under 35 U.S.C. 154(b) by 0 days.

(21) Appl. No.: 17/000,197

(22) Filed: Aug. 21, 2020

(51) Int. Cl.
  *G06Q 20/32* (2012.01)
  *G06F 21/32* (2013.01)
  *G06K 7/14* (2006.01)
  *G06Q 20/10* (2012.01)

(52) U.S. Cl.
  CPC ......... *G06Q 20/3276* (2013.01); *G06F 21/32* (2013.01); *G06K 7/1417* (2013.01); *G06Q 20/3224* (2013.01); *G06Q 20/1085* (2013.01)

(58) Field of Classification Search
  None
  See application file for complete search history.

(56) References Cited

U.S. PATENT DOCUMENTS

| | | | | |
|---|---|---|---|---|
| 10,445,711 | B1 * | 10/2019 | Arumugam | G06Q 20/385 |
| 2010/0149335 | A1 * | 6/2010 | Miller, II | G08B 13/1961 |
| | | | | 348/148 |
| 2012/0278214 | A1 * | 11/2012 | Kumar | G06Q 30/00 |
| | | | | 705/34 |
| 2017/0053252 | A1 * | 2/2017 | Votaw | G06Q 20/3223 |
| 2017/0286930 | A1 * | 10/2017 | Hao | G07F 19/206 |
| 2019/0045020 | A1 * | 2/2019 | Ein-Gil | G06F 16/9535 |
| 2019/0213311 | A1 * | 7/2019 | Tussy | G06K 9/00288 |
| 2019/0354941 | A1 * | 11/2019 | Welch | G06Q 20/385 |

\* cited by examiner

*Primary Examiner* — Edward Chang
*Assistant Examiner* — Amit Patel
(74) *Attorney, Agent, or Firm* — The Iwashko Law Firm, PLLC; Lev Ivan Gabriel Iwashko (57) ABSTRACT

A system having a program running thereon, the system including a storage device to store data regarding a session connection, at least one first apparatus, including an input unit to scan a prompt code, a processing unit to generate a replica of a touch-based input unit in response to the input unit scanning the prompt code, a display unit to display the replica of the touch-based input unit, and a communication unit to transmit an input signal from the input unit, and at least one second apparatus, including another communication unit to communicate with and receive the input signal from the communication unit, another display unit to display the prompt code thereon in response to the communication unit being within at least one of a first predetermined distance and a second predetermined distance of the another communication unit, another input unit comprising the touch-based input unit, and another processing unit to register the input signal corresponding to a same input on the another input unit.

20 Claims, 4 Drawing Sheets

SYSTEM AND APPLICATION TO CONTROL A TOUCH OPERATED DEVICE USING A MOBILE DEVICE

BACKGROUND

1. Field

The present general inventive concept relates generally to an application to control a touch operated device, and particularly, to a system and application to control a touch operated device using a mobile device.

2. Description of the Related Art

Touch-based input and output devices are used to operate a multitude of different machines and devices. Specifically, the different machines include mechanical devices, electronic devices, computing devices, transaction processing devices, and communication devices that use touch-based input devices to operate. For example, automated teller machines (ATMs), kiosks, self-service checkouts, gas pumps, appliances, machinery, entry locks, and vehicles use some form of a touch-based input and output device.

The popularity of touch-based input and output devices has resulted in the development and introduction of many different types, such as touchscreen displays, touchpads, key pads, and/or touch operated inputs, as a means to operate machines, computing and/or communication devices. In turn, the ease-of-use of touch operated devices has increased the adoption of touch as a means of user input. Consequently, the proliferation of touch-based applications has increased the need to assure safe and secure user operation.

Commonly used security protocols include passwords, personal identification numbers, two-factor authentication, and security questions. However, there are opportunities for improvement by making the process more secure, more private, and more hygienic, thereby increasing user adoption.

Currently, many people use a personal tablet computer, cell phone and/or a smart watch, any of which is referred to as a mobile device, to perform a variety of tasks including making a telephone call, browsing the Internet, perform a calculation, setting a time-based alarm, and/or checking the weather. Moreover, mobile devices are personal devices, such that, in most cases, only the owner uses the mobile device. Nearly all mobile devices require user authentication as a means to access and operate the mobile device, thus limiting device operation an owner or an authorized user. In other words, the owner of the mobile device will use it most of the time with occasional use by a family member and/or a friend. As such, most of the time, the owner will be the only person to touch his/her mobile device.

Therefore, there is a need for a system and application to control touch operated devices using a mobile device.

SUMMARY

The present general inventive concept provides a system and application to control a touch operated device using a mobile device.

Additional features and utilities of the present general inventive concept will be set forth in part in the description which follows and, in part, will be obvious from the description, or may be learned by practice of the general inventive concept.

The foregoing, and/or other features and utilities of the present general inventive concept, may be achieved by providing a system and application running a program thereon, the system including a local or remote storage device to store data regarding a session connection, at least one first apparatus, including a input unit to scan, or means to manually enter, a prompt code, a processing unit to generate a replica or an operational equivalent of the display of a touch operated machine or device in response to processing the prompt code, a display unit to display the replica of machine's or device's the touch-based input and output unit, and a communication unit to transmit and receive a signal from the touch operated machine or device or from a remotely controlled device operating in conjunction with the machine or device, and at least one second apparatus, including another communication unit to communicate with and receive or transmit the signal from the first apparatus or remotely from a controlling intermediary device with which the apparatuses communicate, another display unit to display the prompt code thereon in response to the communication unit being within at least one of a first predetermined distance and a second predetermined distance of the another communication unit or an affixed prompt code thereon, a touch-based input unit, and another processing unit to register the input signal corresponding to a same input on the another input unit.

The system may further include a network to allow communication between the storage device, the at least one first apparatus, and the at least one second apparatus.

The at least one first apparatus and the at least one second apparatus may adjust a type of communication based on whether the at least one first apparatus is within at least one of the first predetermined distance and the second predetermined distance of the at least one second apparatus.

The at least one second apparatus may define the first predetermined distance as 30 cm.

The at least one second apparatus may define the first predetermined distance as 100 cm.

The at least one first apparatus and the at least one second apparatus may use GIS to identify a location of the at least one first apparatus.

The at least one first apparatus and the at least one second apparatus may use encryption to communicate.

The at least one first apparatus using the program may operate differently based on a type of machine of the at least one second apparatus, such that the input unit changes based on the type of machine.

The at least one first apparatus may scan the prompt code as a machine readable code.

The at least one first apparatus may scan the prompt code as a human readable code.

The at least one second apparatus may prevent use of the prompt code more than once.

The at least one first apparatus may require executing a link displayed on at least one of the program, a web browser, and SMS, prior to generating the replica of the touch-based input unit.

The at least one first apparatus may require entry of an authentication code prior to generating the replica of the touch-based input unit.

The at least one first apparatus may require entry of at least one additional authentication code during use of the replica of the touch-based input unit.

The at least one second apparatus may terminate communication with the at least one first apparatus in response to the authentication code being incorrect.

The at least one second apparatus may terminate communication with the at least one first apparatus in response to the at least one first apparatus exceeding at least one of the first predetermined distance and the second predetermined distance.

The at least one first apparatus may terminate communication with the at least one second apparatus in response to a first biometric reading being different from at least one second biometric reading, and continue communication with the at least one second apparatus in response to the first biometric reading being the same as the at least one second biometric reading.

The at least one first apparatus may terminate communication with the at least one second apparatus in response to a stress level exceeding an average stress level by a predetermined calculation amount.

The at least one first apparatus may require a final prompt code to conclude all transactions.

The at least one first apparatus and the at least one second apparatus may resume a native operating state after termination of communication therebetween.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

System 100
Storage Device 110
First Apparatus 120
Input Unit 121
Display Unit 122
Processing Unit 123
Communications Unit 124
Storage Unit 125
Second Apparatus 130
Input Unit 131
Display Unit 132
Processing Unit 133
Communications Unit 134
Storage Unit 135
Network 140

Figure 1A:
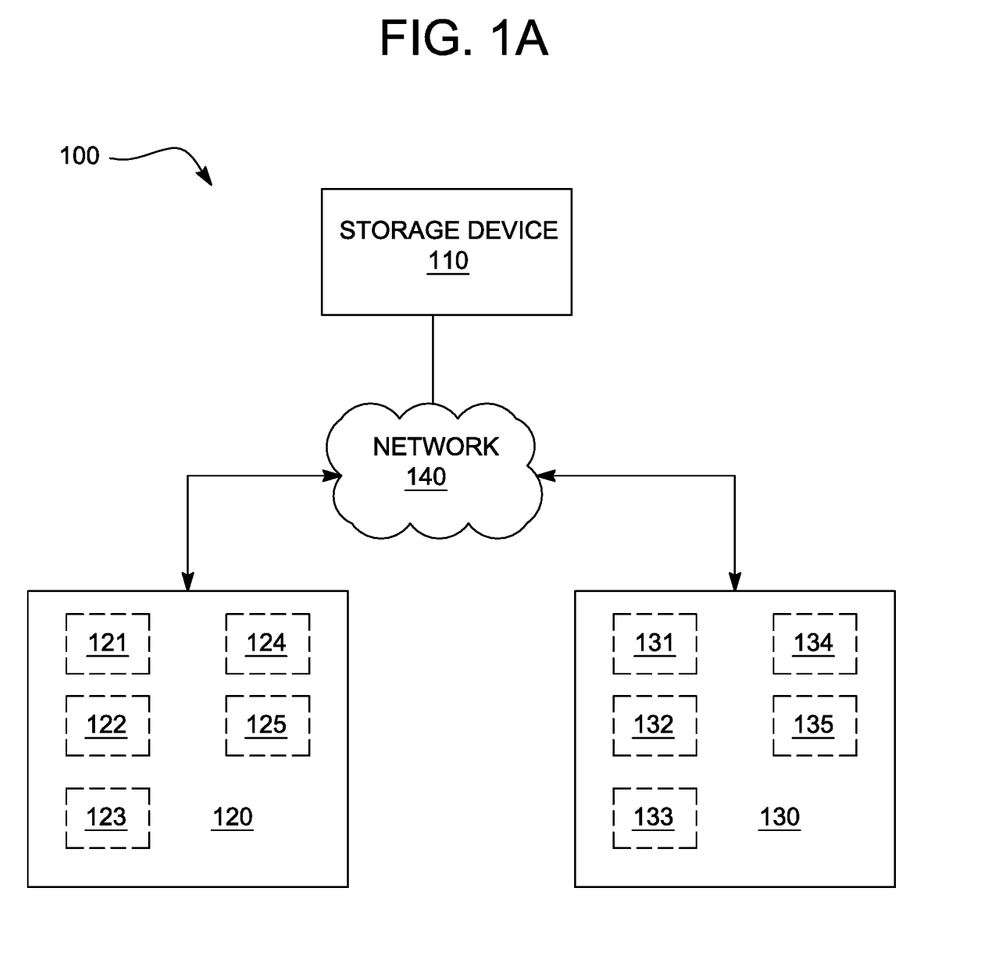
FIG. 1A illustrates a system to control at least one second apparatus using at least one first apparatus, according to an exemplary embodiment of the present general inventive concept.

FIG. 1A illustrates a system 100 to control at least one second apparatus 130 using at least one first apparatus 120, according to an exemplary embodiment of the present general inventive concept.

Figure 1B:
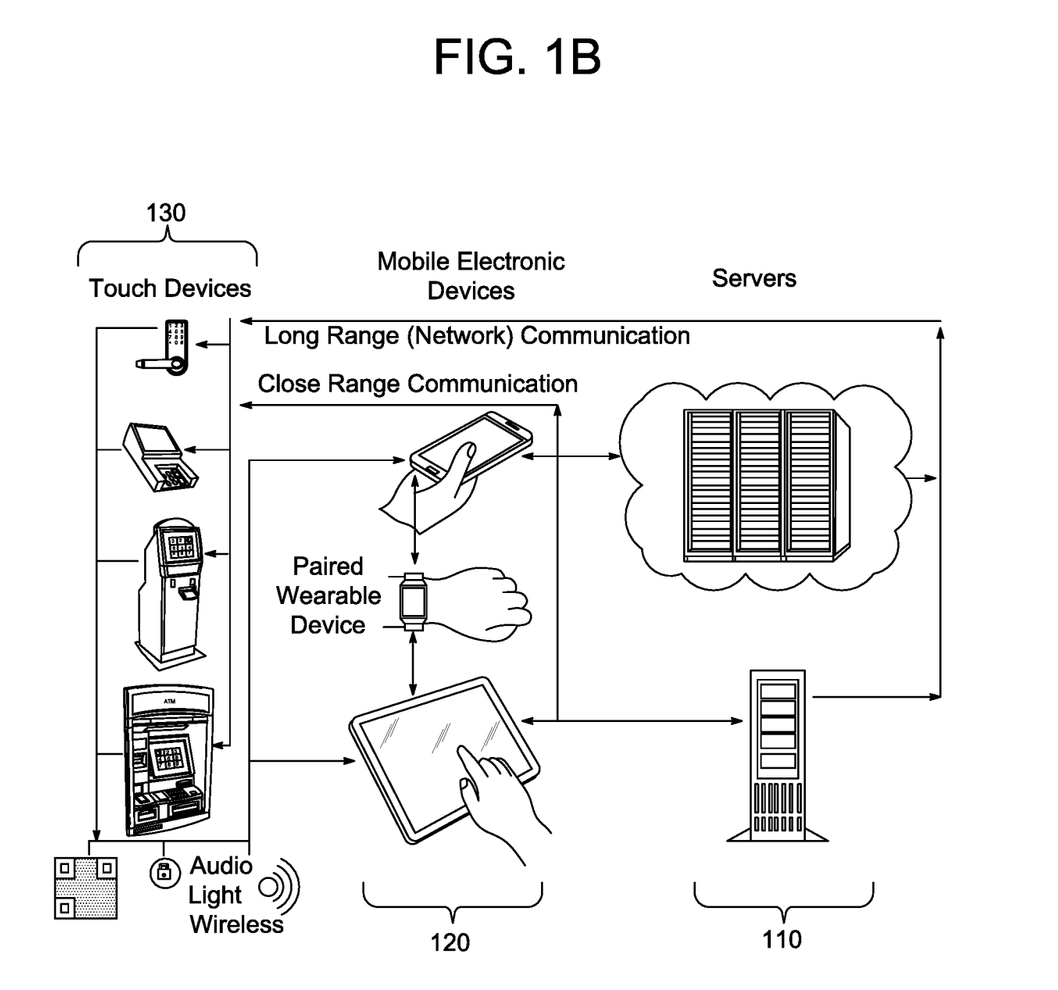
FIG. 1B illustrates the system to control the at least one second apparatus using the at least one first apparatus as connected to multiple networks, according to an exemplary embodiment of the present general inventive concept.

FIG. 1B illustrates the system to control the at least one second apparatus 130 using the at least one first apparatus 120 as connected to multiple networks, according to an exemplary embodiment of the present general inventive concept.

The system 100 may include a storage device 110, at least one first apparatus 120, at least one second apparatus 130, and a network 140, but is not limited thereto.

The storage device 110 may include a server, a computing device with a storage unit, and a cloud-based storage space, but is not limited thereto. The storage device 110 may store and/or execute a software program and/or application running thereon to control at least one touch-based input device and/or touch operated device using at least one mobile device. More specifically, the storage device 110 may have a program running thereon to control the at least one second apparatus 130 using the at least one first apparatus 120. As such, the storage device 110 may store data regarding a session connection, such as between the at least one first apparatus 120 and/or the at least one second apparatus 130.

Additionally, the at least one first apparatus 120 may be described as a mobile device. For example, the at least one first apparatus 120 may be a smartphone, a cellphone, a smartwatch, a tablet, a personal digital assistant (PDA), a laptop computer, and an electronic reader, but is not limited thereto.

The at least one first apparatus 120 may include an input unit 121, a display unit 122, a processing unit 123, a communication unit 124, and a storage unit 125, but is not limited thereto.

The input unit 121 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 122 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 122 may be combined with the input unit 121 to be a touch-screen.

The processing unit 123 (or central processing unit, CPU) may include electronic circuitry to carry out instructions of a computer program by performing basic arithmetic, logical, control and input/output (I/O) operations specified by the instructions. The processing unit 123 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 123 may also include a microprocessor and a microcontroller.

The communication unit 124 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 125 may include a random access memory (RAM), a read-only memory (ROM), a hard disk, a flash drive, a database connected to the Internet, cloud-based storage, Internet-based storage, or any other type of storage unit.

The at least one first apparatus 120 may access the Internet via the communication unit 124 to allow at least one user to access a website, and/or may allow a mobile application and/or the software application to be executed using the processing unit 123. For ease of description, the mobile and/or the software application will be hereinafter referred to as an app. The app may be downloaded from the Internet, such as the storage device 110, to be stored on the storage unit 125. In other words, the software application stored on the storage device 110 may be the same as the app stored on the storage unit 125 of the at least one first apparatus 120.

The at least one first apparatus 120 may use the app via the input unit 121 and/or the communication unit 124 to allow the at least one user to track and/or locate a geographical position of the at least one second apparatus 130. For example, the input unit 121 may receive a tracking command into the app to identify the geographical position of the at least one second apparatus 130 using GPS.

The at least one second apparatus 130 may be described as a touch-based input device. For example, the at least one second apparatus 130 may be an ATM, a kiosk, a self-service checkout machine, a gas pump, an appliances, a mechanical machine, a door entry lock, and/or a vehicle. As such, the at least one second apparatus 130 may include a variety of different types of machines. However, the at least one second apparatus 130 may use any combination of touch-based input units, such as a touchscreen, a touchpad, a key pad, and/or a touch operated input.

The at least one second apparatus 130 may include an input unit 131, a display unit 132, a processing unit 133, a communication unit 134, and a storage unit 135, but is not limited thereto.

The input unit 131 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 132 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 132 may be combined with the input unit 131 to be a touch-screen.

The processing unit 133 (or central processing unit, CPU) may include electronic circuitry to carry out instructions of a computer program by performing basic arithmetic, logical, control and input/output (I/O) operations specified by the instructions. The processing unit 133 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 133 may also include a microprocessor and a microcontroller.

The communication unit 134 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 135 may include a random access memory (RAM), a read-only memory (ROM), a hard disk, a flash drive, a database connected to the Internet, cloud-based storage, Internet-based storage, or any other type of storage unit.

The at least one second apparatus 130 may access the Internet via the communication unit 134 to receive and/or update the app, as described above, to be executed using the processing unit 133. The app may be downloaded from the Internet and/or the storage device 110 to be stored on the storage unit 135.

In operation, the processing unit 133 of the at least one second apparatus 130 may use the app to use the communication unit 134 to scan for a presence of the communication unit 124 of the at least one first apparatus 120 within a proximity of the at least one second apparatus 130. In other words, the communication unit 134 may detect the presence of the communication unit 124 within a predetermined distance of the communication unit 134.

More specifically, the communication unit 134 may use a first predetermined distance (i.e. close range) and/or a second predetermined distance (i.e. long range) to determine a type of communication. The communication unit 134 may use the first predetermined distance in response to the at least one first apparatus 120 being within 100 centimeters (cm). Alternatively, the first predetermined distance may be adjusted to be within 30 cm distance, depending on a preference of an operator and/or manufacturer of the at least one second apparatus 130. Conversely, the second predetermined distance may be more than 30 cm and/or 100 cm, but less than 200 cm. Moreover, the communication unit 124 and/or the communication unit 134 may use geographic information systems (GIS) and/or GPS to identify a location of the at least one first apparatus 120.

As such, the communication unit 134 may utilize BLUETOOTH, Wi-Fi, NFC, RF, inductive coupling, ultrasonic audio coupling, light based coupling, and/or other electronic coupling during communications within the first predetermined distance. For example, inductive coupling may include radio frequency identification (RFID), and other electronic coupling may include infrared data association (IrDA) and/or ultrasonic communication.

Furthermore, the communication unit 134 may utilize internet protocol (IP) address and/or network node identification modes, such as the Internet, virtual private network (VPN), and/or wide area networks for communications within the second predetermined distance and/or greater than the first predetermined distance.

As such, the communication unit 134 and/or the communication unit 124 may adjust a type of communication based on whether the communication unit 124 is within the first predetermined distance and/or the second predetermine distance.

The communication unit 124 and/or the communication unit 134 may use encryption (e.g., symmetric key, public key, etc.) to communicate for each signal sent and/or received between the at least one first apparatus 120 and/or the at least one second apparatus 130.

Subsequent to the at least one first apparatus 120 moving within the first predetermined distance and/or the second predetermined distance, the processing unit 133 of the at least one second apparatus 130 may generate a prompt code via the app to be displayed on at least a portion of the display unit 132. Moreover, the processing unit 133 via the app may generate the prompt code based on a type of the at least one second apparatus 130. For example, the processing unit 133 via the app may generate the prompt code including a machine readable code (e.g., a quick response (QR) code, a barcode, etc.) for an ATM and/or a gas pump, and/or a human readable code (e.g., a pin, a password, an alphanumeric phrase, a picture, an image, etc.) for a door entry lock and/or a vehicle.

Furthermore, the processing unit 133 of the at least one second apparatus 130 may identify a type of machine of the at least one second apparatus 130 to the processing unit 123 of the at least one first apparatus 120. Therefore, the processing unit 123 of the at least one first apparatus 120 may execute the app such that the app operates according to the type of machine and/or recognizes the type of machine of the at least one second apparatus 130. For example, the input unit 121 of the at least one first apparatus 120 via the app may operate differently in response to the at least one second apparatus 130 being an ATM versus the at least one second apparatus 130 being a door entry lock, such that the input unit 121 changes based on the type of machine of the at least one second apparatus 130.

Figure 2:
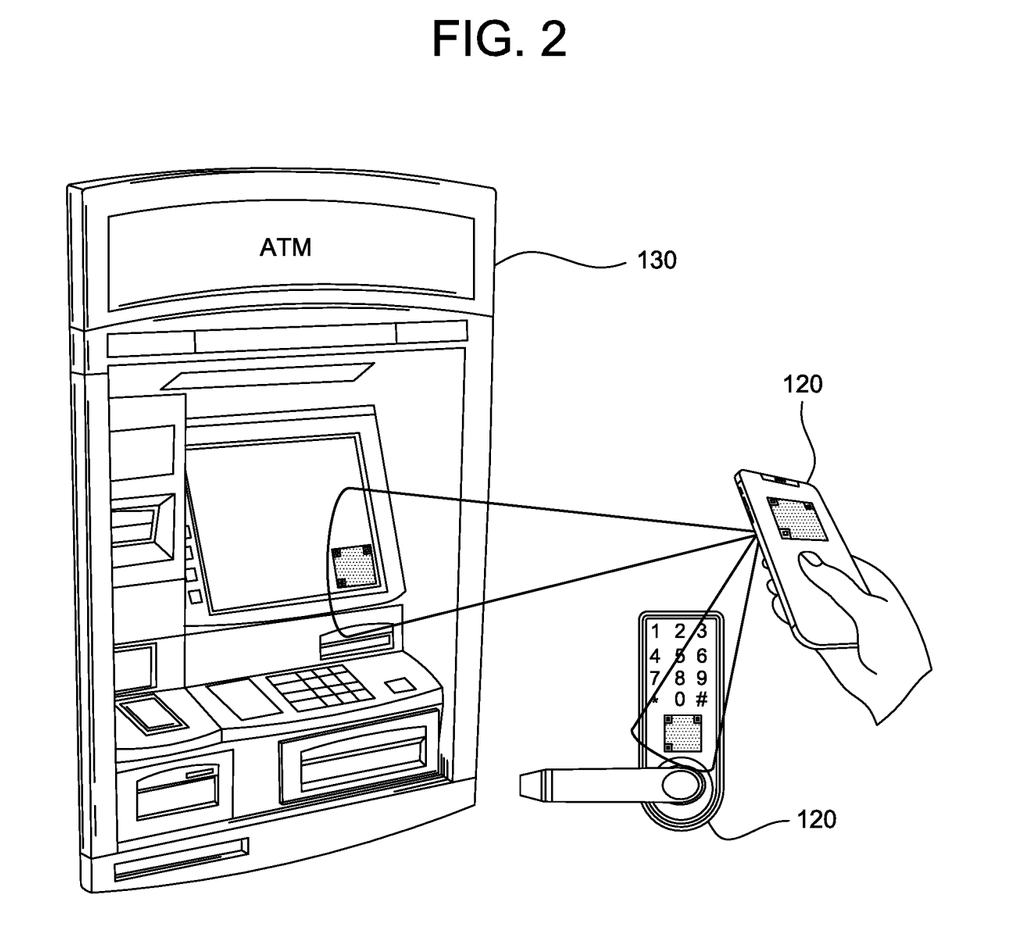
FIG. 2 illustrates a machine-readable prompt code generated on the at least one second apparatus being scanned on the at least one first apparatus, according to an exemplary embodiment of the present general inventive concept.

FIG. 2 illustrates a machine-readable prompt code generated on the at least one second apparatus 130 being scanned on the at least one first apparatus 120, according to an exemplary embodiment of the present general inventive concept.

Referring to FIG. 2, a camera of the input unit 121 of the at least one first apparatus 120 may scan the prompt code, as the machine readable code, to initiate communications, such as a session between the communication unit 124 of the at least one first apparatus 120 and the communication unit 134 of the at least one second apparatus 130. The prompt code may be generated and/or affixed via a substrate to the at least one second apparatus 130. Also, only one prompt code may be recognized at a time, such that another at least one first apparatus 120 may not use the same prompt code to form communications with the at least one second apparatus 130. As such, this prevents fraud and/or at least one third party from using the same prompt code to access the session with the at least one second apparatus 130.

Additionally, the processing unit 133 of the at least one second apparatus 130 via the app may generate an authentication code that is transmitted from the communication unit 134 to the communication unit 124 of the at least one first apparatus 120 to instruct the at least one user to enter a confirmation code (e.g., a six digit alphanumeric code) on the input unit 121. Alternatively, the authentication code may be another machine readable code, such that scanning via the camera of the input unit 121 may be performed. However, the storage device 110 and/or the at least one second apparatus 130 may terminate communications between the at least one first apparatus 120 and/or the at least one second apparatus 130 in response to the authentication code being incorrect.

Accordingly, the input unit 121 may receive the confirmation code and/or the input unit 121 may receive identifying information of the at least one user that is transmitted from the storage device 110 over the network 140.

Subsequently, the processing unit 123 of the at least one first apparatus 120 using the app may generate the session including a session identification (ID) in response to establishing communication with the at least one second apparatus 130. Furthermore, the processing unit 123 may transmit a link to a graphical user interface (GUI) on the display unit 122 using the app, a web browser, and/or a short message service (SMS) in response to creation of the session ID. Upon clicking and/or tapping the link, the processing unit 123 may generate a replicated GUI and/or other user interface of the input unit 131 of the at least one second apparatus 130. In other words, the processing unit 123 may generate a replica of the input unit 131.

Figure 3:
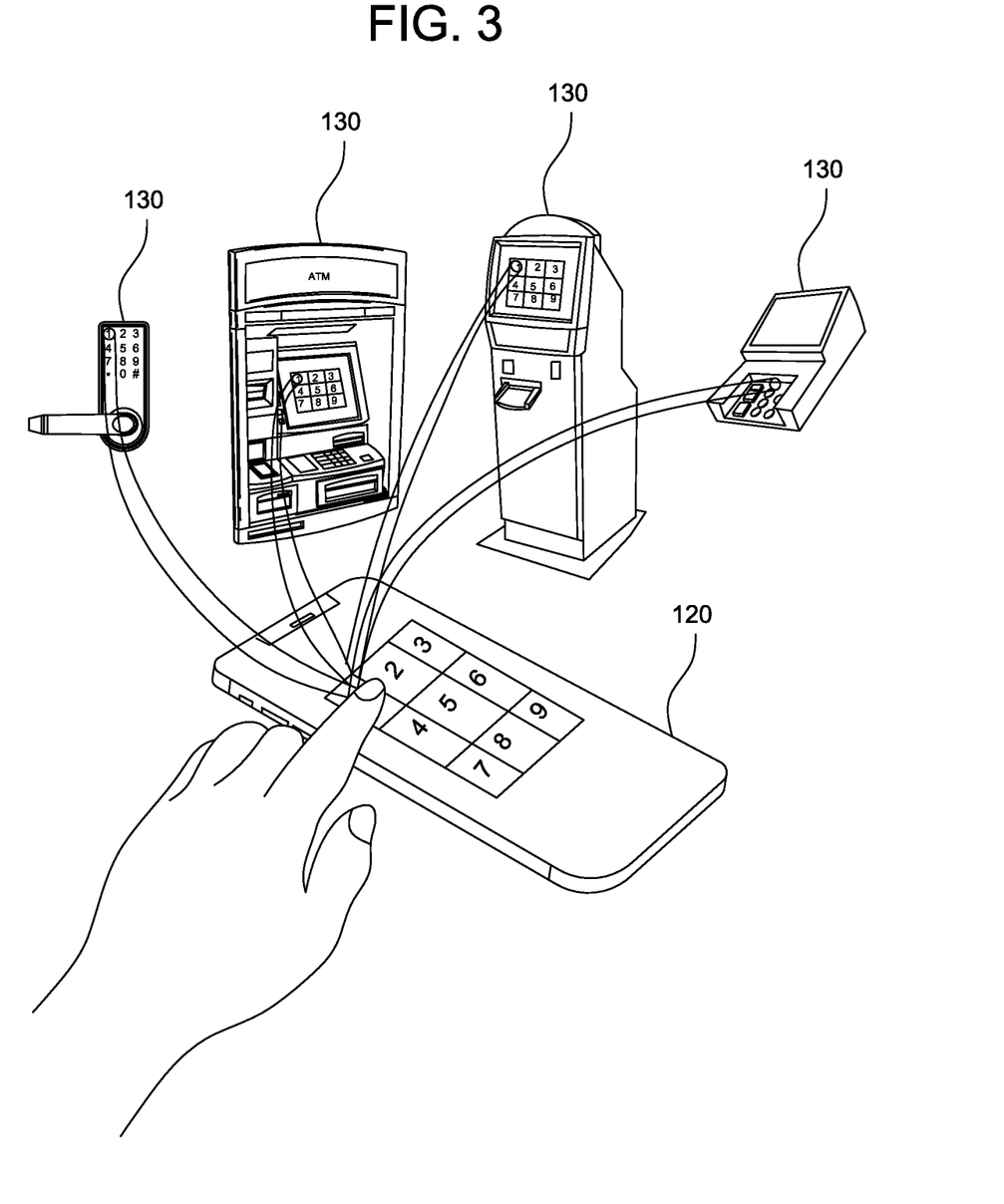
FIG. 3 illustrates an input generated on the at least one second apparatus in response to another input received on the at least one first apparatus, according to an exemplary embodiment of the present general inventive concept.

FIG. 3 illustrates an input generated on the at least one second apparatus 130 in response to another input received on the at least one first apparatus 120, according to an exemplary embodiment of the present general inventive concept.

Thereafter, the input unit 121 and/or the display unit 122, as a touchscreen, of the at least one first apparatus 120 may appear identical to the input unit 131 and/or the display unit 132 of the at least one second apparatus 130. Moreover, as illustrated in FIG. 3, the input unit 121 via the app may receive at least one input thereon, such that the communication unit 124 transmits an input signal to the communication unit 134 and is registered in the processing unit 133 as input received by the input unit 131. In other words, the processing unit 133 of the at least one second apparatus 130 may receive input from the input unit 121 of the at least one first apparatus 120 in response to the input unit 121 receiving input thereon from the at least one user.

For example, the display unit 122 may appear as a key pad for a door lock. The input unit 121 may receive an input to enter the input signal that is transmitted from the communication unit 124 to the communication 134, and received by the processing unit 133, as if the at least one user entered the input directly on the input unit 131, such that the input may be a touch on the touchscreen, a voice activated command, a text, and/or a motion gesture. Therefore, the input unit 121 may allow alternative types of input due to a disability (e.g., injured limbs, injured mouth, etc.) of the at least one user.

During connection of the at least one first apparatus 120 to the at least one second apparatus 130, the storage device 110 and/or the at least one second apparatus 130 via the app may perform at least one additional authentication check by sending at least one additional authentication code to the at least one first apparatus 120 at a predetermined time interval. As such, the storage device 110 and/or the at least one second apparatus 130 via the app may allow the at least one first apparatus 120 to continue communication with the at least one second apparatus 130 in response to receiving another input confirmation of the at least one additional authentication code on the input unit 121.

However, the storage device 110 and/or the at least one second apparatus 130 may terminate communications between the at least one first apparatus 120 and/or the at least one second apparatus 130 in response to the another authentication code being incorrect. Also, the storage device 110 and/or the at least one second apparatus 130 may terminate communications between the at least one first apparatus 120 and/or the at least one second apparatus 130 in response to the at least one first apparatus 120 exceeding the first predetermined distance, the second predetermined distance, and/or the communications being interrupted (e.g., loss in signal).

Furthermore, during use, the input unit 121 of the at least one first apparatus 120 via the app may detect a biometric reading thereto via the fingerprint reader, the voice recognition unit, the iris scanner, and/or the facial recognition unit, such that the processing unit 123 may compare a first biometric reading to at least one second biometric reading (i.e. each successive biometric reading). As such, the processing unit 123 may determine whether the at least one second biometric reading is similar to the first biometric reading. Moreover, the processing unit 123 may terminate communications between the at least one first apparatus 120 and/or the at least one second apparatus 130 in response to the at least one second biometric reading being different from the first biometric reading, and continue communications between the at least one first apparatus 120 and/or the at least one second apparatus 130 in response to the at least one second biometric reading being the same as the first biometric reading.

Also, the input unit 121 of the at least one first apparatus 120 via the app may detect a stress level of the at least one user. Additionally, the processing unit 123 may compare the stress level to an average stress level of the at least one user, such that the processing unit 123 may terminate communications between the at least one first apparatus 120 and/or the at least one second apparatus 130 in response to the stress level exceeding the average stress level by a predetermined calculation amount (e.g., 1%, 5%, 10%, etc.) that indicates the at least one user is experiencing an emergency event, such as theft by the at least one third party.

Accordingly, the processing unit 123 of the at least one first apparatus 120 via the app may prevent the at least one third party from access to the at least one first apparatus 120 and/or the at least one second apparatus 130.

At the conclusion of the session of the at least one user, the storage device 110 and/or the processing unit 133 of the at least one second apparatus 130 via the app may request a final prompt code and/or the another authentication code from the input unit 121 of the at least one first apparatus 120 to conclude all transactions. Following the conclusion of the session, the at least one first apparatus 120 and/or the at least one second apparatus 130 may resume a native operating state, such that the app may terminate communication therebetween and/or the processing unit 133 of the at least one second apparatus 130 does not receive and/or register additional input from the input unit 121 as a corresponding input to the input unit 131.

Referring to FIG. 1, the network 140 may be at least one of the Internet, a cellular network, a universal mobile telecommunications systems (UMTS) network, a Long Term Evolution (LTE) network, a Global System for Mobile Communications (GSM) network, a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. The network 140 can be implemented with any number of hardware and software components, transmission media, and network protocols. FIG. 1 illustrates the network 140 as a single network, but is not limited thereto.

The at least one first apparatus 120 and/or the at least one second apparatus 130 may send data to and/or receive data from the storage device 110 over via the Internet or any of the above-mentioned networks. The at least one first apparatus 120 and/or the at least one second apparatus 130 can be directly coupled to the storage device 110. Alternatively, the at least one first apparatus 120 and/or the at least one second apparatus 130 can be connected to the storage device 110 via any other suitable device, communication network, and/or combination thereof. For example, the at least one first apparatus 120 can be coupled to the storage device 110 via routers, switches, access points, and/or communication networks. In other words, the storage device 110, the at least one first apparatus 120, and the at least one second apparatus 130 may all communicate with each other via the network 140.

Furthermore, any new data input and/or stored on the storage device 110, the storage unit 125 of the at least one first apparatus 120, and/or the storage unit 135 of the at least one second apparatus 130 may be periodically transmitted to each other device and/or apparatus, such that the each other device and/or apparatus may be updated. In other words, the storage device 110, the storage unit 125 of the at least one first apparatus 120, and/or the storage unit 135 of the at least one second apparatus 130 may synchronize to keep the app and data updated.

Therefore, the system 100 may allow the at least one user to perform tasks without having to use a public device, such as an ATM or a gas pump that many people touch. Additionally, the system 100 may provide convenience, such that the at least one user does not have to approach the public device to use the public device.

The present general inventive concept may include a system 100 having a program running thereon, the system 100 including a storage device 110 to store data regarding a session connection, at least one first apparatus 120, including an input unit 121 to scan a prompt code, a processing unit 123 to generate a replica of a touch-based input unit in response to the input unit 121 scanning the prompt code, a display unit 122 to display the replica of the touch-based input unit, and a communication unit 124 to transmit an input signal from the input unit 121, and at least one second apparatus 130, including another communication unit 134 to communicate with and receive the input signal from the communication unit 124, another display unit 132 to display the prompt code thereon in response to the communication unit 124 being within at least one of a first predetermined distance and a second predetermined distance of the another communication unit 134, another input unit 131 comprising the touch-based input unit, and another processing unit 133 to register the input signal corresponding to a same input on the another input unit 131.

The system 100 may further include a network 140 to allow communication between the storage device 110, the at least one first apparatus 120, and the at least one second apparatus 130.

The at least one first apparatus 120 and the at least one second apparatus 130 may adjust a type of communication based on whether the at least one first apparatus 120 is within at least one of the first predetermined distance and the second predetermined distance of the at least one second apparatus 130.

The at least one second apparatus 130 may define the first predetermined distance as 30 cm.

The at least one second apparatus 130 may define the first predetermined distance as 100 cm.

The at least one first apparatus 120 and the at least one second apparatus 130 may use GIS to identify a location of the at least one first apparatus 120.

The at least one first apparatus 120 and the at least one second apparatus 130 may use encryption to communicate.

The at least one first apparatus 120 using the program may operate differently based on a type of machine of the at least one second apparatus 130, such that the input unit 121 changes based on the type of machine.

The at least one first apparatus 120 may scan the prompt code as a machine readable code.

The at least one first apparatus 120 may scan the prompt code as a human readable code.

The at least one second apparatus 130 may prevent use of the prompt code more than once.

The at least one first apparatus 120 may require executing a link displayed on at least one of the program, a web browser, and SMS prior to generating the replica of the touch-based input unit.

The at least one first apparatus 120 may require entry of an authentication code prior to generating the replica of the touch-based input unit.

The at least one first apparatus 120 may require entry of at least one additional authentication code during use of the replica of the touch-based input unit.

The at least one second apparatus 130 may terminate communication with the at least one first apparatus 120 in response to the authentication code being incorrect.

The at least one second apparatus 130 may terminate communication with the at least one first apparatus 120 in response to the at least one first apparatus 120 exceeding at least one of the first predetermined distance and the second predetermined distance.

The at least one first apparatus 120 may terminate communication with the at least one second apparatus 130 in response to a first biometric reading being different from at least one second biometric reading, and continue communication with the at least one second apparatus 130 in response to the first biometric reading being the same as the at least one second biometric reading.

The at least one first apparatus 120 may terminate communication with the at least one second apparatus 130 in response to a stress level exceeding an average stress level by a predetermined calculation amount.

The at least one first apparatus 120 may require a final prompt code to conclude all transactions.

The at least one first apparatus 120 and the at least one second apparatus 130 may resume a native operating state after termination of communication therebetween.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A system having a program running thereon, the system comprising:
    a storage device to store data regarding a session connection;
    at least one first apparatus, comprising:
        a first input unit to scan a prompt code,
        a first processing unit to generate a replica of a touch-based input unit in response to the first input unit scanning the prompt code,
        a first display unit to display the replica of the touch-based input unit generated on the first processing unit running the program, and
        a first communication unit to transmit an input signal from the first input unit; and
    at least one second apparatus, comprising:
        a second communication unit to communicate with and receive the input signal from the first communication unit,
        a second display unit to display the prompt code generated thereon in response to the first communication unit being within at least one of a first predetermined distance and a second predetermined distance of the second communication unit, such that the first display unit displays a graphical user interface (GUI) generated on the first processing unit that is identical to a GUI of the second display unit in addition to the replica of the touch-based input unit,
        a second input unit comprising the touch-based input unit, and
        a second processing unit to register the input signal corresponding to a same input on the second input unit.

2. The system of claim 1, further comprising:
    a network to allow communication between the storage device, the at least one first apparatus, and the at least one second apparatus.

3. The system of claim 1, wherein the at least one first apparatus and the at least one second apparatus adjust a type of communication based on whether the at least one first apparatus is within at least one of the first predetermined distance and the second predetermined distance of the at least one second apparatus.

4. The system of claim 1, wherein the at least one second apparatus defines the first predetermined distance as 30 cm.

5. The system of claim 1, wherein the at least one second apparatus defines the first predetermined distance as 100 cm.

6. The system of claim 1, wherein the at least one first apparatus and the at least one second apparatus use GIS to identify a location of the at least one first apparatus.

7. The system of claim 1, wherein the at least one first apparatus and the at least one second apparatus use encryption to communicate.

8. The system of claim 1, wherein the at least one first apparatus using the program operates differently based on a type of machine of the at least one second apparatus, such that the input unit changes based on the type of machine.

9. The system of claim 1, wherein the at least one first apparatus scans the prompt code as a machine readable code.

10. The system of claim 1, wherein the at least one first apparatus scans the prompt code as a human readable code.

11. The system of claim 1, wherein the at least one second apparatus prevents use of the prompt code more than once.

12. The system of claim 1, wherein the at least one first apparatus requires executing a link displayed on at least one of the program, a web browser, and SMS prior to generating the replica of the touch-based input unit.

13. The system of claim 1, wherein the at least one first apparatus requires entry of an authentication code prior to generating the replica of the touch-based input unit.

14. The system of claim 13, wherein the at least one first apparatus requires entry of at least one additional authentication code during use of the replica of the touch-based input unit.

15. The system of claim 13, wherein the at least one second apparatus terminates communication with the at least one first apparatus in response to the authentication code being incorrect.

16. The system of claim 1, wherein the at least one second apparatus terminates communication with the at least one first apparatus in response to the at least one first apparatus exceeding at least one of the first predetermined distance and the second predetermined distance.

17. The system of claim 1, wherein the at least one first apparatus terminates communication with the at least one second apparatus in response to a first biometric reading being different from at least one second biometric reading, and continue communication with the at least one second apparatus in response to the first biometric reading being the same as the at least one second biometric reading.

18. The system of claim 1, wherein the at least one first apparatus terminates communication with the at least one second apparatus in response to a stress level exceeding an average stress level by a predetermined calculation amount.

19. The system of claim 1, wherein the at least one first apparatus requires a final prompt code to conclude all transactions.

20. The system of claim 1, wherein the at least one first apparatus and the at least one second apparatus resume a native operating state after termination of communication therebetween.

* * * * *